United States Patent
Ryan et al.

(10) Patent No.: US 11,775,620 B2
(45) Date of Patent: Oct. 3, 2023

(54) SYSTEM AND METHOD FOR BLOCKING SCREENSHOTS AND SCREEN RECORDINGS OF PREMIUM USER-GENERATED CONTENT

(71) Applicant: Sunroom, Brooklyn, NY (US)

(72) Inventors: Nikolas Sean Ryan, Brooklyn, NY (US); Lucy Mort, Brooklyn, NY (US)

(73) Assignee: Sunroom, Brooklyn, NY (US)

( * ) Notice: Subject to any disclaimer, the term of this patent is extended or adjusted under 35 U.S.C. 154(b) by 105 days.

(21) Appl. No.: 17/643,763

(22) Filed: Dec. 10, 2021

(65) Prior Publication Data

US 2023/0185884 A1 Jun. 15, 2023

(51) Int. Cl.
| | | |
|---|---|---|
| *G06F 21/10* | (2013.01) | |
| *G06V 10/70* | (2022.01) | |
| *G06V 10/40* | (2022.01) | |
| *G06V 30/10* | (2022.01) | |
| *H04L 9/08* | (2006.01) | |
| *H04L 9/06* | (2006.01) | |

(52) U.S. Cl.
CPC ............ *G06F 21/10* (2013.01); *G06V 10/40* (2022.01); *G06V 10/70* (2022.01); *G06V 30/10* (2022.01); *H04L 9/0631* (2013.01); *H04L 9/0819* (2013.01); *G06F 2221/0724* (2013.01); *G06F 2221/0753* (2013.01); *G06V 2201/02* (2022.01)

(58) Field of Classification Search
CPC ...... G06F 21/6209; G06F 21/10; G06F 21/84; H04L 9/3226
See application file for complete search history.

(56) References Cited

U.S. PATENT DOCUMENTS

| | | | |
|---|---|---|---|
| 2007/0107062 A1 | 5/2007 | Abu-Amara | |
| 2009/0262122 A1* | 10/2009 | Darsa | G09G 5/14 345/545 |
| 2014/0006782 A1 | 1/2014 | Johnson et al. | |
| (Continued) | | | |

OTHER PUBLICATIONS

Dylko et al. "Media effects in an era of rapid technological transformation; A case of user-generated content and political participation." Communication Theory 22.3 (2012) 250-278. Aug. 2012.

(Continued)

*Primary Examiner* — Dao Q Ho
(74) *Attorney, Agent, or Firm* — Perkins Coie LLP; Lena Petrovic; Vikram Iyengar

(57) ABSTRACT

Methods, systems, and apparatus for blocking screenshots and screen recordings of content are disclosed. A first media content frame is received from a first computer device. It is determined that one or more user interface elements are present in the first media content frame. The user interface elements are extracted from the first media content frame. The user interface elements are converted to video. The video is encrypted to prevent screenshot capture of the one or more user interface elements present in the first media content frame by a second computer device lacking a decryption key when the video is played on a digital screen of the second computer device. A second media content frame is generated including the first media content frame overlaid by the video. The second media content frame is transmitted to the second computer device for the second media content frame to be played.

20 Claims, 4 Drawing Sheets

(56) References Cited

U.S. PATENT DOCUMENTS

| | | | |
|---|---|---|---|
| 2016/0241934 A1* | 8/2016 | Harrison | H04L 61/2514 |
| 2016/0246999 A1* | 8/2016 | Pielot | G06F 21/6209 |
| 2016/0253508 A1* | 9/2016 | Song | G06F 21/554 |
| | | | 726/29 |
| 2018/0019962 A1* | 1/2018 | Sayko | H04L 51/52 |
| 2019/0050666 A1* | 2/2019 | Kim | H04N 21/8405 |
| 2020/0004930 A1* | 1/2020 | Myman | G06F 21/10 |

OTHER PUBLICATIONS

"International Search Report and Written Opinion" dated Mar. 16, 2023, for International Application No. PCT/US2022/081360; 14 pages.

* cited by examiner

SYSTEM AND METHOD FOR BLOCKING SCREENSHOTS AND SCREEN RECORDINGS OF PREMIUM USER-GENERATED CONTENT

TECHNICAL FIELD

The present disclosure is generally related to digital media communication and specifically to systems and methods for blocking screenshots and screen recordings of premium user-generated content.

BACKGROUND

Digital rights management (DRM) tools and technological protection measures (TPM) refer to access control technologies for restricting the use of proprietary hardware and copyrighted works. Worldwide, several measures have been put in place to criminalize the circumvention of DRM, communication about such circumvention, and the creation and distribution of tools used for such circumvention. However, traditional methods that include restrictive licensing agreements are typically insufficient to provide fine-grained restriction of access to digital materials. Moreover, traditional methods can sometimes cause problems for legitimate consumers while trying to distinguish between legitimate and illegitimate users.

SUMMARY

Methods, apparatus, and systems for blocking screenshots and screen recordings of premium user-generated content are disclosed. In some embodiments, one or more processors receive a first media content frame from a first computer device. The one or more processors determine that one or more user interface elements are present in the first media content frame. The one or more processors extract the one or more user interface elements from the first media content frame. The one or more processors convert the one or more user interface elements to video. The one or more processors encrypt the video to prevent screenshot capture of the one or more user interface elements present in the first media content frame by a second computer device lacking a decryption key when the video is played on a digital screen of the second computer device. The one or more processors generate a second media content frame including the first media content frame overlaid by the video. The one or more processors transmit the second media content frame to the second computer device for the second media content frame to be played on the digital screen of the second computer device.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples.

This document presents methods, systems, and apparatus for blocking screenshots and screen recordings of premium user-generated content. The embodiments disclosed herein describe a first media content frame received from a first computer device. It is determined that one or more user interface elements are present in the first media content frame. The user interface elements are extracted from the first media content frame. The user interface elements are converted to video. The video is encrypted to prevent screenshot capture of the one or more user interface elements present in the first media content frame by a second computer device lacking a decryption key when the video is played on a digital screen of the second computer device. A second media content frame is generated including the first media content frame overlaid by the video. The second media content frame is transmitted to the second computer device for the second media content frame to be played.

The advantages and benefits of the methods, systems, and apparatus for blocking screenshots and screen recordings of premium user-generated content disclosed herein include preventing screenshot capture and dissemination of confidential information. The embodiments disclosed enable digital rights management, for example, for copyright-protected media content. Using the method disclosed, content creators can limit user recording and sharing of premium content without a valid decryption key. Moreover, a content creator can limit screenshot capture to particular portions or elements of the media content, such as user interface elements, while permitting screenshot capture of remaining portions of a screen.

Figure 1:
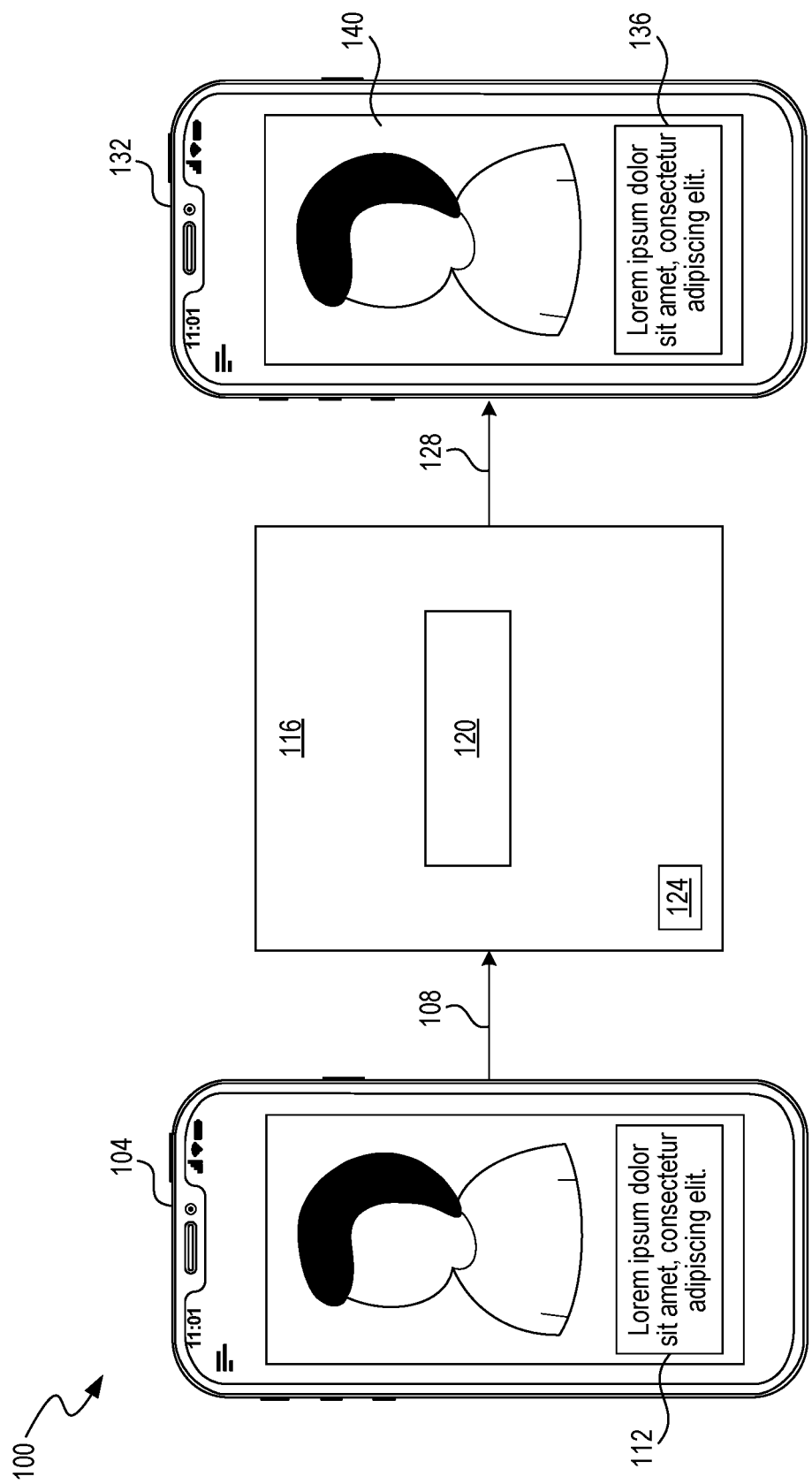
FIG. 1 is a block diagram illustrating an example environment for blocking screenshots and screen recordings of premium user-generated content, in accordance with one or more embodiments.

FIG. 1 is a block diagram illustrating an example environment 100 for blocking screenshots and screen recordings of premium user-generated content, in accordance with one or more embodiments. The environment 100 includes a first computer device 104, a device 116, and a second computer device 132. The environment 100 is implemented using the components of the example computer system 400 illustrated and described in more detail with reference to FIG. 4. Likewise, embodiments of the environment 100 can include different and/or additional components, or be connected in different ways.

The first computer device 104 is a smartphone, tablet, laptop, desktop, server, etc., and is implemented using the components of the example computer system 400 illustrated and described in more detail with reference to FIG. 4. The first computer device 104 connects to the device 116 using a hardwired connection (e.g., the bus 416) or the network 414 and/or the network adapter 412 illustrated and described in more detail with reference to FIG. 4. A user, such as a content creator, uses the first computer device 104 to create or send media content, such as video, virtual reality content, augmented reality content, etc., to the device 114. The content can be a brand video, a social media video, or animated content. The content can include still images, video, user interface elements 112, such as chat bubbles, soft buttons, menus, icons, comment bubbles, any other user interface element, or a combination thereof.

The content created or transmitted by the first computer device 104 can be premium content. Premium content is a type of digital content that may be accessed for a fee, and is usually of higher quality or more desirable than free content. A content creator may seek to prevent a downstream user of the premium content from recording, capturing by screenshot, or sharing the premium content with unauthorized users. The content creator may seek to prevent a downstream user from recording, capturing by screenshot, or sharing only particular portions of the premium content with unauthorized users. The content creator may seek to prevent a downstream user from recording or capturing by screenshot only particular portions of a digital screen on which the premium content is played. For example, the content creator may seek to prevent a downstream user from recording or capturing by screenshot only the user interface elements displayed on a user's screen or some other particular portion of the screen.

The device 116 is a smartphone, tablet, laptop, desktop, server, etc., and is implemented using the components of the example computer system 400 illustrated and described in more detail with reference to FIG. 4. The device 116 includes a software module 120 that can store and/or execute computer-readable instructions, e.g., the instructions 404, 408 illustrated and described in more detail with reference to FIG. 4. In some embodiments, the software module 120 implements the machine learning system 300 illustrated and described in more detail with reference to FIG. 3. The device 114 connects to the second computer device 132 using a hardwired connection (e.g., the bus 416) or the network 414 and/or the network adapter 412 illustrated and described in more detail with reference to FIG. 4.

The second computer device 132 is a smartphone, tablet, laptop, desktop, server, etc., and is implemented using the components of the example computer system 400 illustrated and described in more detail with reference to FIG. 4. A user, such as a consumer of online content, uses the second computer device 132 to receive and play media content, such as video, virtual reality content, augmented reality content, etc. The content is played on a digital screen 140 of the second computer device 132. Audio components of the content are played on a built-in speaker of the second computer device 132.

The device 116 receives a first media content frame 108 from the first computer device 104. In some embodiments, the first media content frame 108 is a portion of a video displayed on a screen for, e.g., 1/24, 1/25, or 1/30 of a second. In other embodiments, the first media content frame 108 is a frame of high-definition video. In other embodiments, the first media content frame 108 is represented as a digital waveform in which pixels represent an intensity and color of light across a screen. The device 116 determines that the one or more user interface elements 112 are present in the first media content frame 108.

Figure 3:
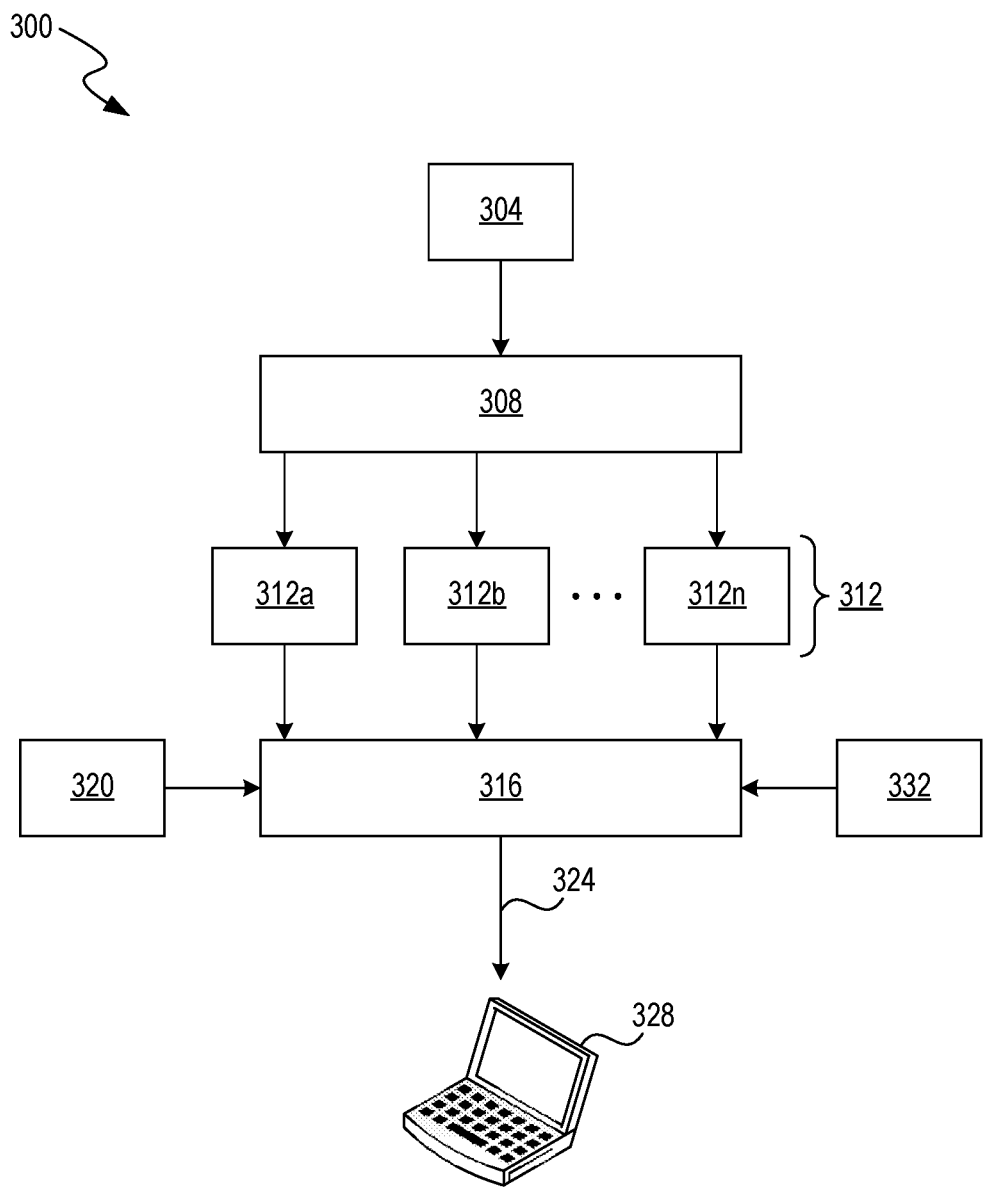
FIG. 3 is a block diagram illustrating an example machine learning system for blocking screenshots and screen recordings of premium user-generated content, in accordance with one or more embodiments.

In some embodiments, the device 116 determines that the one or more user interface elements 112 are present in the first media content frame 108 by executing a machine learning model 316 on the first media content frame 108. The machine learning model 316 is illustrated and described in more detail with reference to FIG. 3. The machine learning model 316 uses the first media content frame 108 as the input data 304 illustrated and described in more detail with reference to FIG. 3. The machine learning model 316 is trained based on the training data 320 to detect the one or more user interface elements 112. For example, the training data 320 includes a labeled version of historical or stored media content frames or videos. In some embodiments, the device 116 extracts a feature vector 312 from the first media content frame 108. The feature vector 312 is illustrated and described in more detail with reference to FIG. 3. For example, a feature 312*a* can describe a chat bubble. A feature 312*b* can describe a soft button, such as a reset button. A feature 312*n* can describe an on-screen menu. In some embodiments, the device 116 sends the feature vector 312 as input to the machine learning model 316 for determining that the one or more user interface elements 112 are present in the first media content frame 108. The output 324 of the machine learning model 316 indicates presence or absence of the one or more user interface elements 112 in the first media content frame 108. The device 328 illustrated and described in more detail with reference to FIG. 3 is the same as or similar to the device 116.

In some embodiments, determining that the one or more user interface elements 112 are present in the first media content frame 108 is performed by optical character recognition (OCR) or natural language processing. OCR refers to the electronic conversion of images of typed, handwritten, or printed text into machine-encoded text. The device 116 can perform OCR on the first media content frame 108 to determine if the first media content frame 108 includes a chat bubble, menu, or comment bubble with text. Natural language processing refers to methods to program computers to process and analyze natural language data, such as the contents of documents. The device 116 can perform natural language processing on the first media content frame 108 to determine if the first media content frame 108 includes a chat bubble, menu, or comment bubble with text.

In some embodiments, the one or more user interface elements 112 are converted to DRM'ed streams. For example, the device 116 extracts the one or more user interface elements 112 from the first media content frame 108. In some embodiments, the device 116 uses OCR or natural language processing to extract the one or more user interface elements 112. In other embodiments, the device 116 uses image processing techniques such as edge detection, cropping, etc., to extract the one or more user interface elements 112. For example, the device 116 can identify points in the first media content frame 108 at which the image brightness changes sharply or has discontinuities. The device 116 can organize the points into a set of curved line segments to extract the user interface elements 112. In some embodiments, the device 116 can remove some of the peripheral areas of the first media content frame 108 to extract the user interface elements 112, change the aspect ratio, or to accentuate or isolate the user interface elements 112 from the first media content frame 108.

The device 116 converts the one or more user interface elements 112 to a video 136. In one embodiment, the device

116 repeats the user interface element 112 over a necessary number of frames, such as 24, 30, or 60 frames to generate one or more seconds of video. In some embodiments, the device 116 changes the storage format of the user interface elements 112 or recompresses the user interface elements 112 to a video format. In other embodiments, the device 116 performs transcoding on the user interface elements 112 to convert the user interface elements 112 to the video 136. Transcoding refers to direct digital-to-digital conversion of one encoding to another, such as for movie data files, audio files (e.g., MP3, WAV), or character encoding.

In some embodiments, prior to encrypting the video 136, the device 116 packages the video 136 using the HTTP Live Streaming (HLS) protocol. HLS refers to a streaming protocol that supports file storage in both MPEG-TS or fragmented mp4 (fmp4) container formats. The device 116 encrypts the video 136 to prevent screenshot capture of the one or more user interface elements 112 present in the first media content frame 108 by the second computer device 132 if the second computer device 132 does not have access to a decryption key 124 needed to decrypt the video 136. The decryption key 124 can be a digital number, such as a 32-bit, 64-bit, or 124-bit number that is generated by the device 116 during encryption of the video 136. The decryption key 124 is used for digital rights management (DRM) by the device 116 or a content service provider to prevent unauthorized copying and sharing of the one or more user interface elements 112 when the video 136 is played on the digital screen 140 of the second computer device 132.

In some embodiments, the device 116 encrypts the video 136 by converting it into MPEG-2 format. In other embodiments, the device 116 encrypts the video 136 by converting it into an MP4 container file having an encrypted advanced audio coding (AAC) layer. The AAC layer includes the video 136. In some embodiments, encrypting the video 136 is performed using an advanced encryption standard (AES) algorithm. AES refers to a subset of the Rijndael block cipher. Rijndael is a family of ciphers having different key and block sizes. In some instances, AES has a block size of 128 bits. AES can have different key lengths: 128, 192, and 256 bits.

To encrypt the video, the AAC layer can be encrypted using the AES algorithm. In some embodiments, SAMPLE-AES is used. SAMPLE-AES is used to encrypt each individual media sample (e.g., video, audio, etc.) on its own using AES encryption. The specific encryption and packaging can be varied depending on the media format, e.g., H. 264, AAC, etc. SAMPLE-AES allows fine-grained encryption modes, e.g., encrypting only I frames, encrypting 1 out of 10 samples, etc.

A decryption key 124 on the second computer device 132 is required to decrypt the video 136. For example, after packaging the video 136, the device 116 encrypts the contents using AES-128 Cipher Block Chaining (CBC) encryption. In CBC mode, an output of the last block of encryption is used to affect a current block. In some embodiments, an initialization vector (IV) is used to generate different ciphertexts (output of the encryption process) even when the same plaintext (input) is encrypted multiple times independently with the same key. The IV behaves like a randomizer and prevents malicious entities or unauthorized users from recreating the decryption key 124 by observing the ciphertext patterns to identify repetitions. In some embodiments, only a portion (e.g., the video 136) of a video segment (e.g., the first media content frame 108) is encrypted using AES-128. The entire video segment (e.g., the first media content frame 108) is not encrypted; this results in power-savings both for the encryption and decryption process (especially as the video resolution of the second media content frame 128 increases).

In some embodiments, the second computer device 132 sends a request to the device 116 for the decryption key 124 when the second computer device 132 encounters the video 136 during playback of the second media content frame 128. For example, a client application (the application or player on the second computer device 132) being used to playback the second media content frame 128 sends a request message to the device 116 or to a license server to obtain the decryption key 124. The device 116 receives the request for the decryption key 124 from the second computer device 132. The device 116 transmits the decryption key 124 to the second computer device 132 for decrypting the video 136. For example, the device 116 manages the keys used for encrypting and decrypting protected content. The device 114 or a license server receives a license request from the second computer device 132. The device 114 wraps the decryption key 124 into a context message and sends it back to the player on the second computer device 132.

In other embodiments, when a user of the second computer device 132 obtains authorization for viewing, recording, or sharing premium content, the user can register the second computer device 132 with the content service. The second computer device 132 gains authorization from the first computer device 104 or the content creator's server, thereby gaining the decryption key 124. Upon attempting to play the second media content frame 128, the second computer device 132 attempts to decrypt the video 136 using the decryption key 124, and if successful, allows screenshot capture or recording of the user interface elements 112 present in the second media content frame 128. Because only a portion (e.g., the video 136) of the entire video frame (e.g., the second media content frame 128) is encrypted, the remainder of the second media content frame 128 can be played and captured without the decryption key 124.

The device 116 generates the second media content frame 128 that includes the first media content frame 108 overlaid by the video 136. The video 136 overlays the portion of the first media content frame 108 corresponding to the user interface elements 112. The device 116 transmits the second media content frame 128 to the second computer device 132 for the second media content frame 128 to be played on the digital screen 140 of the second computer device 132. If the second computer device 132 has the correct decryption key 124 (i.e., the user of the second computer device 132 is authorized to record the user interface elements 112), the second computer device 132 will be able to record or screenshot capture the user interface elements 112 overlaid by the video 136. If the second computer device 132 lacks the decryption key 124, the second computer device 132 will be unable to decrypt the video 136 and record or screenshot capture the user interface elements 112. Because only a portion (e.g., the video 136) of the entire video frame (e.g., the second media content frame 128) is encrypted, the remainder of the second media content frame 128 can be played and captured without the decryption key 124. In some embodiments, software to prevent screenshot capture, such as Apple Fairplay or other DRM software is used.

Figure 2:
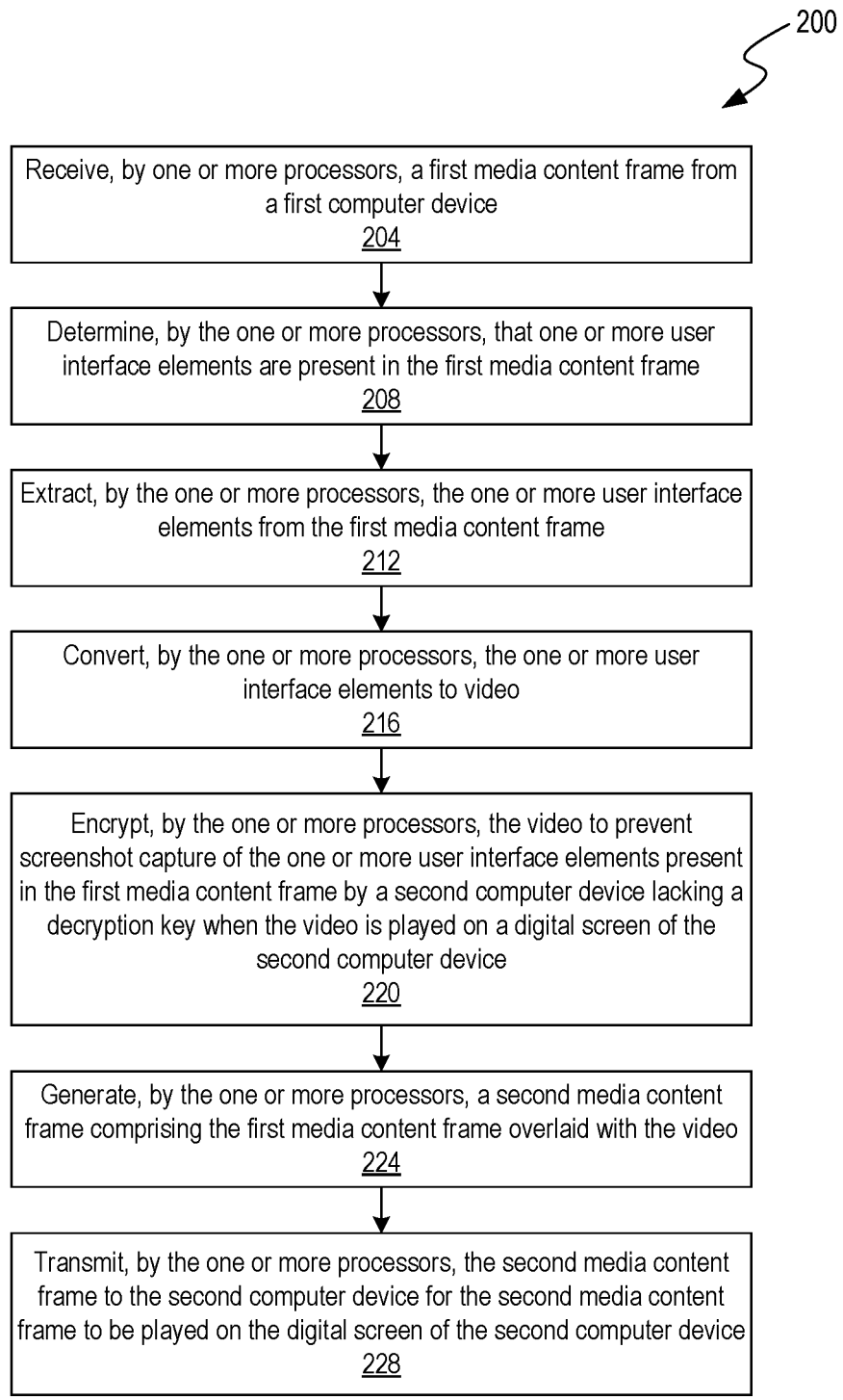
FIG. 2 is a flow diagram illustrating an example process for blocking screenshots and screen recordings of premium user-generated content, in accordance with one or more embodiments.

FIG. 2 is a flow diagram illustrating an example process 200 for blocking screenshots and screen recordings of premium user-generated content, in accordance with one or more embodiments. In some embodiments, the process 200 is performed by the device 116 illustrated and described in more detail with reference to FIG. 1. In other embodiments, the process 200 of FIG. 2 is performed by a computer system, e.g., the example computer system 400 illustrated and described in more detail with reference to FIG. 4. Particular entities, for example a machine learning system 300, perform some or all of the steps of the process in other embodiments. The machine learning system 300 is illustrated and described in more detail with reference to FIG. 3. Likewise, embodiments can include different and/or additional steps, or perform the steps in different orders.

In step 204, the device 116 receives a first media content frame 108 from a first computer device 104. The first media content frame 108 and the first computer device 104 are illustrated and described in more detail with reference to FIG. 1. In some embodiments, the first media content frame 108 is a portion of a video displayed on a screen for, e.g., 1/24, 1/25, or 1/30 of a second. In other embodiments, the first media content frame 108 is a frame of high-definition video. In other embodiments, the first media content frame 108 is represented as a digital waveform in which pixels represent an intensity and color of light across a screen.

In step 208, the device 116 determines that one or more user interface elements 112 are present in the first media content frame 108. The user interface elements 112 are illustrated and described in more detail with reference to FIG. 1. In some embodiments, the one or more user interface elements 112 include at least one of a chat bubble, a soft button, a menu, an icon, or a comment bubble. In some embodiments, determining that the one or more user interface elements 112 are present in the first media content frame 108 is performed by executing a machine learning model 316 on the first media content frame 108. The machine learning model 316 is illustrated and described in more detail with reference to FIG. 3. The machine learning model 316 is trained based on training data 320 to detect the one or more user interface elements 112. The training data 320 is illustrated and described in more detail with reference to FIG. 3. In some embodiments, the device 116 extracts a feature vector 312 from the first media content frame 108. The feature vector 312 is illustrated and described in more detail with reference to FIG. 3. In some embodiments, the device 116 sends the feature vector 312 as input to the machine learning model 316 for determining that the one or more user interface elements 112 are present in the first media content frame 108. In other embodiments, determining that the one or more user interface elements 112 are present in the first media content frame 108 is performed by OCR or natural language processing.

In step 212, the device 116 extracts the one or more user interface elements 112 from the first media content frame 108. In some embodiments, the device 116 uses OCR or natural language processing to extract the one or more user interface elements 112. In other embodiments, the device 116 uses image processing techniques such as edge detection, cropping, etc., to extract the one or more user interface elements 112. For example, the device 116 can identify points in the first media content frame 108 at which the image brightness changes sharply or has discontinuities. The device 116 can organize the points into a set of curved line segments to extract the user interface elements 112.

In step 216, the device 116 converts the one or more user interface elements 112 to video. In some embodiments, the device 116 changes the storage format of the user interface elements 112 or recompresses the user interface elements 112 to a video format. In other embodiments, the device 116 performs transcoding on the user interface elements 112 to convert the user interface elements 112 to the video 136. The device 116 is illustrated and described in more detail with reference to FIG. 1. Transcoding refers to direct digital-to-digital conversion of one encoding to another, such as for movie data files, audio files (e.g., MP3, WAV), or character encoding.

In step 220, the device 116 encrypts the video 136 to prevent screenshot capture. Screenshot capture of the one or more user interface elements 112 present in the first media content frame 108 is prevented by the second computer device 132 if the second computer device 132 lacks access to the decryption key 124 when the video 136 is played on the digital screen 140 of the second computer device 132. The decryption key 124, the second computer device 132, and the digital screen 140 are illustrated and described in more detail with reference to FIG. 1. In some embodiments, encrypting the video 136 is performed using an AES algorithm.

In step 224, the device 116 generates a second media content frame 128 including the first media content frame 108 overlaid by the video 136. The video 136 overlays the portion of the first media content frame 108 corresponding to the user interface elements 112.

In step 228, the device 116 transmits the second media content frame 128 to the second computer device 132 for the second media content frame 128 to be played on the digital screen 140 of the second computer device 132. If the second computer device 132 has the correct decryption key 124 (i.e., the user of the second computer device 132 is authorized to record the user interface elements 112), the second computer device 132 will be able to record or screenshot capture the user interface elements 112 overlaid by the video 136. If the second computer device 132 lacks the decryption key 124, the second computer device 132 will be unable to decrypt the video 136 and record or screenshot capture the user interface elements 112. Because only a portion (e.g., the video 136) of the entire video frame (e.g., the second media content frame 128) is encrypted, the remainder of the second media content frame 128 can be played and captured without the decryption key 124.

FIG. 3 is a block diagram illustrating an example machine learning system 300 for blocking screenshots and screen recordings of premium user-generated content, in accordance with one or more embodiments. The machine learning system 300 is implemented using components of the example computer system 400 illustrated and described in more detail with reference to FIG. 4. For example, the machine learning system 300 can be implemented on the processor 402 using instructions 408 programmed in the memory 406 illustrated and described in more detail with reference to FIG. 4. Likewise, embodiments of the machine learning system 300 can include different and/or additional components, or be connected in different ways. The machine learning system 300 is sometimes referred to as a machine learning module.

The machine learning system 300 includes a feature extraction module 308 implemented using components of the example computer system 400 illustrated and described in more detail with reference to FIG. 4. In some embodiments, the feature extraction module 308 extracts a feature vector 312 from input data 304. For example, the input data 304 can include the first media content frame 108 illustrated and described in more detail with reference to FIG. 1. The feature vector 312 includes features 312a, 312b, . . . , 312n. The feature extraction module 308 reduces the redundancy in the input data 304, e.g., repetitive data values, to transform the input data 304 into the reduced set of features 312, e.g., features 312a, 312b, and 312n. The feature vector 312 contains the relevant information from the input data 304, such that events or data value thresholds of interest can be identified by the machine learning model 316 by using this reduced representation. In some example embodiments, the following dimensionality reduction techniques are used by the feature extraction module 308: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

In alternate embodiments, the machine learning model 316 performs deep learning (also known as deep structured learning or hierarchical learning) directly on the input data 304 to learn data representations, as opposed to using task-specific algorithms. In deep learning, no explicit feature extraction is performed; the features 312 are implicitly extracted by the machine learning system 300. For example, the machine learning model 316 can use a cascade of multiple layers of nonlinear processing units for implicit feature extraction and transformation. Each successive layer uses the output from the previous layer as input. The machine learning model 316 can thus learn in supervised (e.g., classification) and/or unsupervised (e.g., pattern analysis) modes. The machine learning model 316 can learn multiple levels of representations that correspond to different levels of abstraction, wherein the different levels form a hierarchy of concepts. In this manner, the machine learning model 316 can be configured to differentiate features of interest from background features.

In alternative example embodiments, the machine learning model 316, e.g., in the form of a convolutional neural network (CNN) generates the output 324, without the need for feature extraction, directly from the input data 304. The output 324 is provided to the computer device 328 or the device 116 illustrated and described in more detail with reference to FIG. 1. The device 116 is a server, computer, tablet, smartphone, smart speaker, etc., implemented using components of the example computer system 400 illustrated and described in more detail with reference to FIG. 4. In some embodiments, the steps performed by the machine learning system 300 are stored in memory on the computer device 116 for execution.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The machine learning model 316 can be a CNN that includes both convolutional layers and max pooling layers. The architecture of the machine learning model 316 can be "fully convolutional," which means that variable sized sensor data vectors can be fed into it. For all convolutional layers, the machine learning model 316 can specify a kernel size, a stride of the convolution, and an amount of zero padding applied to the input of that layer. For the pooling layers the model 316 can specify the kernel size and stride of the pooling.

In some embodiments, the machine learning system 300 trains the machine learning model 316, based on the training data 230, to correlate the feature vector 312 to expected outputs in the training data 330. As part of the training of the machine learning model 316, the machine learning system 300 forms a training set of features and training labels by identifying a positive training set of features that have been determined to have a desired property in question, and, in some embodiments, forms a negative training set of features that lack the property in question.

The machine learning system 300 applies machine learning techniques to train the machine learning model 316, that when applied to the feature vector 312, outputs indications of whether the feature vector 312 has an associated desired property or properties, such as a probability that the feature vector 312 has a particular Boolean property, or an estimated value of a scalar property. The machine learning system 300 can further apply dimensionality reduction (e.g., via linear discriminant analysis (LDA), principle component analysis (PCA), or the like) to reduce the amount of data in the feature vector 312 to a smaller, more representative set of data.

The machine learning system 300 can use supervised machine learning to train the machine learning model 316, with feature vectors of the positive training set and the negative training set serving as the inputs. In some embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 332 is formed of additional features, other than those in the training data 330, which have already been determined to have or to lack the property in question. The machine learning system 300 applies the trained machine learning model 316 to the features of the validation set 332 to quantify the accuracy of the machine learning model 316. Common metrics applied in accuracy measurement include: Precision and Recall, where Precision refers to a number of results the machine learning model 316 correctly predicted out of the total it predicted, and Recall is a number of results the machine learning model 316 correctly predicted out of the total number of features that did have the desired property in question. In some embodiments, the machine learning system 300 iteratively re-trains the machine learning model 316 until the occurrence of a stopping condition, such as the accuracy measurement indication that the machine learning model 316 is sufficiently accurate, or a number of training rounds having taken place.

Figure 4:
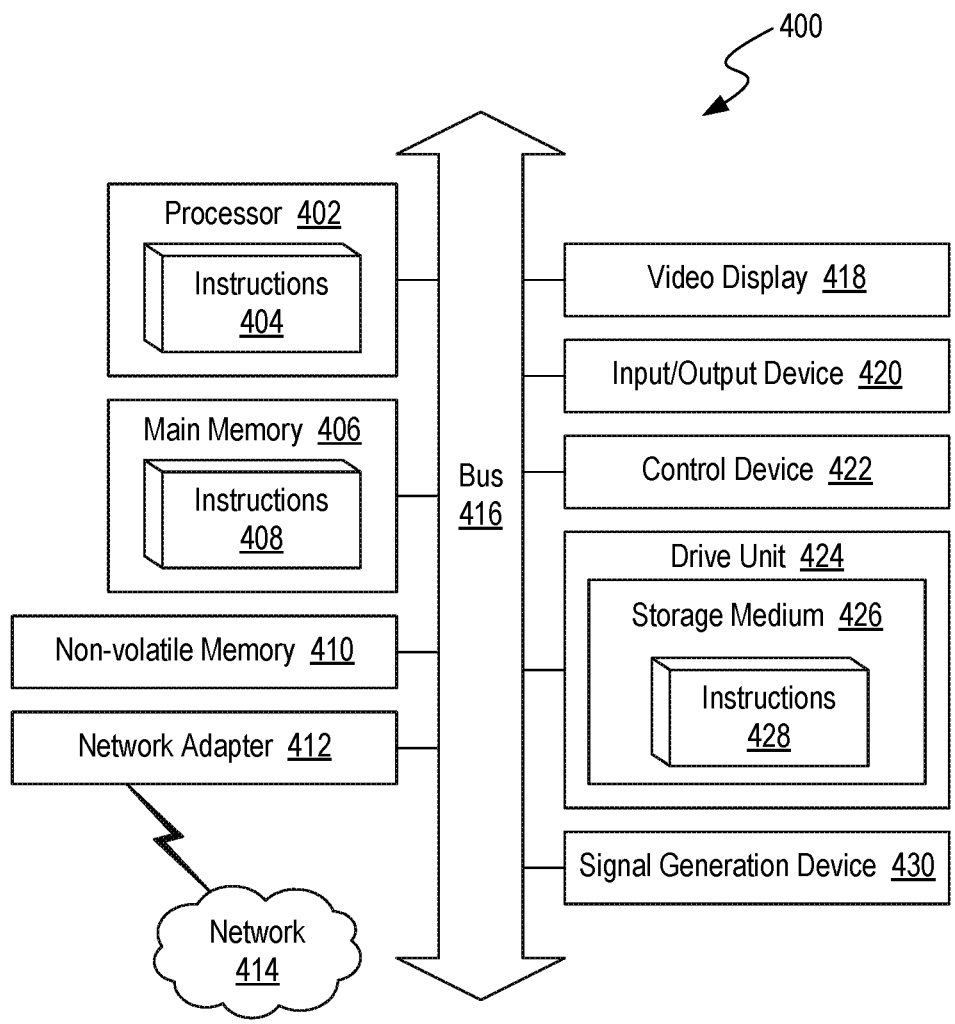
FIG. 4 is a block diagram illustrating an example computer system for blocking screenshots and screen recordings of premium user-generated content, in accordance with one or more embodiments.

FIG. 4 is a block diagram illustrating an example computer system 400 for blocking screenshots and screen recordings of premium user-generated content, in accordance with one or more embodiments. Components of the example computer system 400 can be used to implement the first computer device 104, the device 116, and the second computer device 132 illustrated and described in more detail with reference to FIG. 1. In some embodiments, components of the example computer system 400 are used to implement the machine learning system 300 illustrated and described in more detail with reference to FIG. 2. At least some operations described herein can be implemented on the computer system 400.

The computer system 400 can include one or more central processing units ("processors") 402, main memory 406, non-volatile memory 410, network adapter 412 (e.g., network interface), video display 418, input/output devices 420, control device 422 (e.g., keyboard and pointing devices), drive unit 424 including a storage medium 426, and a signal generation device 430 that are communicatively connected to a bus 416. The bus 416 is illustrated as an abstraction that represents one or more physical buses and/or point-to-point connections that are connected by appropriate bridges, adapters, or controllers. The bus 416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 400 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 400.

While the main memory 406, non-volatile memory 410, and storage medium 426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 428. The term "machine-readable medium" and "storage medium" shall also be taken to include any medium that is capable of storing, encoding, or carrying a set of instructions for execution by the computer system 400.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 404, 408, 428) set at various times in various memory and storage devices in a computing device. When read and executed by the one or more processors 402, the instruction(s) cause the computer system 400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 412 enables the computer system 400 to mediate data in a network 414 with an entity that is external to the computer system 400 through any communication protocol supported by the computer system 400 and the external entity. The network adapter 412 can include a network adaptor card, a wireless network interface card, a router, an access point, a wireless router, a switch, a multi-layer switch, a protocol converter, a gateway, a bridge, a bridge router, a hub, a digital media receiver, and/or a repeater.

The network adapter 412 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:
1. A method comprising:
receiving, by one or more processors, a first media content frame from a first computer device;

determining, by the one or more processors, that one or more user interface elements are present in the first media content frame;
extracting, by the one or more processors, the one or more user interface elements from the first media content frame;
converting, by the one or more processors, the one or more user interface elements to video;
encrypting, by the one or more processors, the video to prevent screenshot capture of the one or more user interface elements present in the first media content frame by a second computer device lacking a decryption key when the video is played on a digital screen of the second computer device;
generating, by the one or more processors, a second media content frame comprising the first media content frame overlaid by the video; and
transmitting, by the one or more processors, the second media content frame to the second computer device for the second media content frame to be played on the digital screen of the second computer device.

2. The method of claim 1, wherein the one or more user interface elements comprise at least one of a chat bubble, a soft button, a menu, an icon, or a comment bubble.

3. The method of claim 1, wherein determining that the one or more user interface elements are present in the first media content frame is performed by executing a machine learning model on the first media content frame, the machine learning model trained based on training data to detect the one or more user interface elements.

4. The method of claim 3, further comprising:
extracting, by the one or more processors, a feature vector from the first media content frame; and
sending, by the one or more processors, the feature vector as input to the machine learning model for determining that the one or more user interface elements are present in the first media content frame.

5. The method of claim 1, wherein determining that the one or more user interface elements are present in the first media content frame is performed by optical character recognition or natural language processing.

6. The method of claim 1, wherein encrypting the video is performed using an advanced encryption standard (AES) algorithm.

7. The method of claim 1, further comprising:
receiving, by the one or more processors, a request for the decryption key from the second computer device; and
transmitting, by the one or more processors, the decryption key to the second computer device for decrypting the video.

8. A system comprising:
one or more computer processors; and
a non-transitory computer readable storage medium storing computer instructions, which when executed by the one or more computer processors cause the one or more computer processors to:
receive a first media content frame from a first computer device;
determine that one or more user interface elements are present in the first media content frame;
extract the one or more user interface elements from the first media content frame;
convert the one or more user interface elements to video;
encrypt the video to prevent screenshot capture of the one or more user interface elements present in the first media content frame by a second computer device lacking a decryption key when the video is played on a digital screen of the second computer device;
generate a second media content frame comprising the first media content frame overlaid by the video; and
transmit the second media content frame to the second computer device for the second media content frame to be played on the digital screen of the second computer device.

9. The system of claim 8, wherein the one or more user interface elements comprise at least one of a chat bubble, a soft button, a menu, an icon, or a comment bubble.

10. The system of claim 8, wherein the instructions to determine that the one or more user interface elements are present in the first media content frame cause the one or more computer processors to execute a machine learning model on the first media content frame, the machine learning model trained based on training data to detect the one or more user interface elements.

11. The system of claim 10, wherein the instructions cause the one or more computer processors to:
extract a feature vector from the first media content frame; and
send the feature vector as input to the machine learning model for determining that the one or more user interface elements are present in the first media content frame.

12. The system of claim 8, wherein the instructions cause the one or more computer processors to determine that the one or more user interface elements are present in the first media content frame by optical character recognition or natural language processing.

13. The system of claim 8, wherein the instructions cause the one or more computer processors to encrypt the video using an advanced encryption standard (AES) algorithm.

14. The system of claim 8, wherein the instructions cause the one or more computer processors to:
receive a request for the decryption key from the second computer device; and
transmit the decryption key to the second computer device for decrypting the video.

15. A non-transitory computer readable storage medium storing computer instructions, which when executed by one or more computer processors cause the one or more computer processors to:
receive a first media content frame from a first computer device;
determine that one or more user interface elements are present in the first media content frame;
extract the one or more user interface elements from the first media content frame;
convert the one or more user interface elements to video;
encrypt the video to prevent screenshot capture of the one or more user interface elements present in the first media content frame by a second computer device lacking a decryption key when the video is played on a digital screen of the second computer device;
generate a second media content frame comprising the first media content frame overlaid by the video; and
transmit the second media content frame to the second computer device for the second media content frame to be played on the digital screen of the second computer device.

16. The storage medium of claim 15, wherein the one or more user interface elements comprise at least one of a chat bubble, a soft button, a menu, an icon, or a comment bubble.

17. The storage medium of claim 15, wherein the instructions to determine that the one or more user interface elements are present in the first media content frame cause the one or more computer processors to execute a machine learning model on the first media content frame, the machine learning model trained based on training data to detect the one or more user interface elements.

18. The storage medium of claim 17, wherein the instructions cause the one or more computer processors to:
   extract a feature vector from the first media content frame; and
   send the feature vector as input to the machine learning model for determining that the one or more user interface elements are present in the first media content frame.

19. The storage medium of claim 15, wherein the instructions cause the one or more computer processors to determine that the one or more user interface elements are present in the first media content frame by optical character recognition or natural language processing.

20. The storage medium of claim 15, wherein the instructions cause the one or more computer processors to encrypt the video using an advanced encryption standard (AES) algorithm.

* * * * *